United States Patent [19]

Le Noane et al.

[11] Patent Number: 5,000,773
[45] Date of Patent: Mar. 19, 1991

[54] PROCESS FOR PRODUCING PREFORMS FOR OPTICAL FIBERS

[76] Inventors: Georges Le Noane, Kerrougant Bras, 22730 Tregastel; Dominique Pavy, Hameau de Pen Ar Pavé, 22300 Lannion, both of France

[21] Appl. No.: 262,069

[22] Filed: Oct. 24, 1988

Related U.S. Application Data

[63] Continuation of Ser. No. 63,146, Jun. 16, 1987, abandoned.

[30] Foreign Application Priority Data

Jun. 20, 1986 [FR] France .................. 86 08946

[51] Int. Cl.$^5$ ............................................. C03C 25/02
[52] U.S. Cl. ........................................ 65/3.12; 65/3.2
[58] Field of Search ............. 65/3.12, 3.2, 18.2–18.4, 65/61, 144

[56] References Cited

U.S. PATENT DOCUMENTS

| | | | |
|---|---|---|---|
| 4,049,940 | 9/1977 | Moisan et al. | 313/231.31 |
| 4,292,063 | 9/1981 | Abe | 65/3.12 |
| 4,402,720 | 9/1983 | Edahiro et al. | 65/3.12 |
| 4,414,488 | 11/1983 | Hoffmann et al. | 315/39 |
| 4,666,488 | 5/1987 | Mizutani et al. | 65/13 |
| 4,675,040 | 6/1987 | Tanaka et al. | 65/3.12 |

FOREIGN PATENT DOCUMENTS

| | | | |
|---|---|---|---|
| 0059564 | 9/1982 | European Pat. Off. | |
| 2068359 | 8/1981 | United Kingdom | 65/3.12 |
| 2079267 | 1/1982 | United Kingdom | |
| 2149779 | 6/1985 | United Kingdom | |
| 2151609 | 7/1985 | United Kingdom | 65/3.12 |

OTHER PUBLICATIONS

M. Moisan et al., Production and Applications of Microwave Surface Wave Plasma at Atmospheric Pressure, Journal of Microwave Power, 14(1), 1979, pp. 57-61.

M. Moisan et al., A. Waveguide-Based Launcher to Sustain Long Plasma Columns Through the Propagation of an Electromagnetic Surface Wave, IEEE Transactions on Plasma Science, vol. PS-12, No. 3, 9/84, pp. 203-213.

*Primary Examiner*—David I. Lacey
*Assistant Examiner*—John J. Bruckner
*Attorney, Agent, or Firm*—Pearne, Gordon, McCoy & Granger

[57] ABSTRACT

A hollow silica bar is formed on a mandrel by an external deposition method using a plasma torch. The mandrel is removed and on the inner face of the bar is deposited a vitreous coating to be used for the subsequent formation of the core of the fibers. Deposition is obtained by means of a plasma column, formed in the bar as a result of an ultra-high frequency coupler able to inject a travelling surface wave into the plasma column.

12 Claims, 3 Drawing Sheets

PROCESS FOR PRODUCING PREFORMS FOR OPTICAL FIBRES

This is a continuation of application Ser. No. 07/063,146 filed on June 16, 1987, now abandoned.

BACKGROUND OF THE INVENTION

The present invention relates to a process for producing preforms or blanks for optical fibres and to a mandrel usable for performing the process. It more particularly applies to the production of monomode or monomodel optical fibres (but obviously also to the production of multimode or multimodel optical fibres).

The known processes for producing preforms for optical fibres suffer from at least one of the following disadvantages: the optical fibres produced from the preforms are costly and/or do not have good geometrical characteristics and/or do not have a good mechanical strength.

In particular, one costly preform producing process for monomode optical fibres is known, in which a not very thick silica tube is covered on its inner face with an appropriate vitreous coating by MCVD (modified chemical vapour phase deposition) or PCVD (plasma chemical vapour phase deposition) and is then enveloped in a thick silica tube.

SUMMARY OF THE INVENTION

The object of the present invention is to obviate the aforementioned disadvantages by proposing a process for producing preforms leading to in particular monomode optical fibres at low cost and with a high mechanical strength and which, in a preferred embodiment, makes it possible to produce preforms leading to optical fibres with good geometrical characteristics.

Specifically the present invention relates to a process for producing a preform for optical fibres, wherein it comprises the following successive stages:

formation of a hollow silica bar on a mandrel by an external deposition method using a plasma torch, removing the mandrel, so that the inner face of the bar appears, and deposition on said inner face of a vitreous coating to be used for the subsequent formation of the core of the optical fibres, wherein the deposition of the coating is carried out by continously passing from one end to the other of the bar a mixture of ionizable gaseous compounds able to give rise to the coating by reacting together and whilst forming in the bar, with the aid of an ultra-high frequency coupler, a plasma column which serves to activate the reaction and by continuously and progressively varying the electromagnetic power supplied to the ultra-high frequency coupler, so that the end of the plasma column sweeps the bar, and wherein the ultra-high frequency coupler is able to inject a travelling surface wave into the plasma column, the pressure of the mixture in the hollow bar being maintained at below approximately $10^4$ Pa and whereby at least the interior of the hollow bar is kept at a temperature at least equal to approximately 1000° C.

The terms "hollow bar" or "axially pierced bar" are understood to mean a very thick tube.

The present external deposition methods make it possible to obtain a directly vitrified silica deposit, in large quantity and at a high deposition rate, the machines used for performing these methods being very simple.

The vitreous coating deposition method does not compromise the thus obtained advantages, the inventive process leading to inexpensive fibres. Moreover, the external deposition methods in question make it possible to obtain a high quality silica deposit, so that mechanically strong fibres are obtained.

It should be noted that, bearing in mind the significant thickness of the silica deposited on the mandrel, MCVD or PCVD would not make it possible to deposit the vitreous coating unlike the method used in the invention (generation and maintenance of the plasma by surface waves), which is free from mechanical displacements and limits heat exchanges with the exterior of the bar.

According to a preferred embodiment of the inventive process, the mandrel is rigid and as far as possible adapts to the shape of a cylinder of revolution of given diameter. Such a mandrel in a well calibrated form and with a good surface state, makes it possible to obtain optical fibres with good geometrical characteristics.

According to a special embodiment of the inventive process, the mandrel is made from a refractory material having an expansion coefficient higher than that of silica.

According to another embodiment, the mandrel is made from silica and removed by coring and drilling.

Advantageously, particularly for the production of monomode optical fibres, the inventive process can also comprise a stage of forming a buffer zone with an optical index substantially equal to that of the hollow bar, between the mandrel removal stage and the vitreous coating deposition stage, said buffer zone being formed in the same way as the vitreous coating using an appropriate gaseous mixture, with a view to improving the quality of the core of the optical fibres obtained.

Preferably, before forming the hollow bar, two silica tubes are fitted on the mandrel in such a way that the ends of the subsequently formed bar respectively partly overlap said tubes. This facilitates the manipulation of the hollow bar when the latter is formed and the performance of the vitreous coating deposition method.

In a special embodiment of the invention, following the deposition of the vitreous coating, the two ends of the bar are sealed with the aid of two tubes.

The invention also relates to a mandrel, which adapts to the shape of a cylinder of revolution and which has two silica tubes fitted on said mandrel on either side thereof.

Preferably, the end of each tube facing the corresponding end of the mandrel has an enlargement. Such enlargements make it possible to form the hollow bar with a minimum material loss.

Through the performance of the process according to the invention, the mandrel can be surrounded with a hollow silica bar, whose ends partly cover or overlap the tubes.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
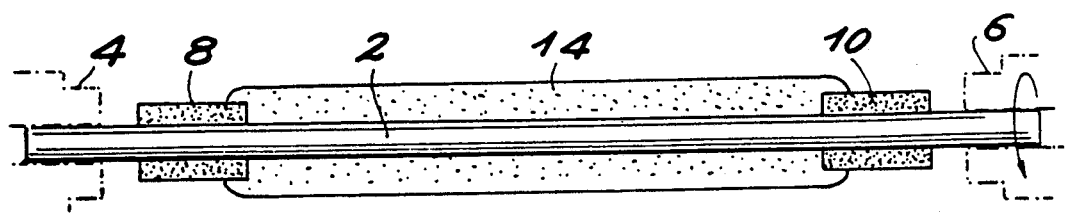
FIG. 1 A diagrammatic view of an apparatus for performing an external deposition method used in the invention.

FIG. 1 diagrammatically shows an apparatus making it possible to obtain a hollow silica bar. This apparatus comprises a rigid mandrel 2 made from a refractory material, such as graphite, alumina or ceramic, whose expansion coefficient is higher than that of silica. As far as possible mandrel 2 adapts to the shape of a perfect cylinder of revolution, has a very good surface state and a precise diameter. For example, it is possible to use a mandrel with a diameter of 20 mm and a tolerance of 0.01 mm (which makes it possible to obtain optical fibres, whose core has a diameter for which the tolerance is below 0.01 micron).

Mandrel 2 is held between two jaws 4 and 6, which can perform a uniform rotary movement on a precise machine, such as a glassmaking lathe. Two silica tubes 8, 10 are accurately fitted and slide on mandrel 2, respectively from the two sides thereof and between the two jaws. For example, tubes which are 20 cm long, with an internal diameter of 20 mm and an external diameter of 26 mm are used.

The silica tubes 8, 10 are separated by a distance substantially equal to the useful length of the preform to be produced, to within 1 or 2 mm. The apparatus also comprises a means 12 constituted by a grain-by-grain plasma torch, when it is wished to produce an undoped silica bar 14, or by a standard plasma torch when it is wished to produce a doped silica bar.

With the mandrel 2 uniformly rotating, the plasma torch 12 performs a translation movement parallel to the axis of said mandrel and performs a number of output and return motions between the two tubes 8, 10 dependent on the chosen thickness for the bar, so that the latter is progressively formed. The length of bar 14 slightly exceeds the distance between the two tubes, so as to permit an anchoring thereof and so as to make it possible to control the phenomena due to the inversion of the displacement direction of the plasma torch.

Figure 2:
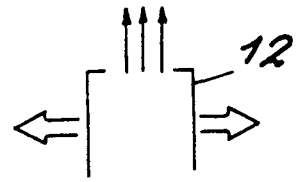
FIG. 2 A diagrammatic view of a hollow silica bar formed by said method around a mandrel.
Figure 2:
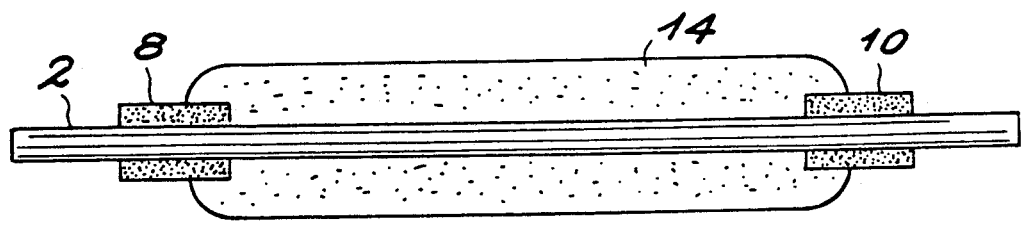

The external diameter and length of the hollow bar obtained (FIG. 2) are obviously chosen as a function of the sought optical fibre production capacity. For example, a diameter of 50 mm and a length of 75 mm make it possible to obtain a preform with a capacity of approximately 100 km of 125 micron diameter fibres (for a diameter 20 mm mandrel).

As stated hereinbefore, the hollow bar can be constituted by doped or undoped silica, as a function of the nature of the fibres to be produced. Through using a rigid and perfectly calibrated mandrel, it is possible to guarantee a radial concentric growth of the bar and therefore excellent geometrical qualities for the optical fibres produced therefrom.

Moreover, the growth of the directly vitrified silica, as a result of the deposition method used, makes it possible to precisely control the shape of the bar during its formation, so that the desired diameter and regularity for said bar can be obtained.

In order to produce an undoped silica bar, the use of a "grain-by-grain plasma torch" process permits growth rates of approximately 5 to 10 g/min.

If it is wished to form a doped silica bar, as stated, use is made of a standard plasma torch process, e.g. permitting fluorine doping. It is thus possible to obtain fibres, whose sheath is fluorine-doped and whose core is of pure silica; said fibres being of great interest in view of their limited attenuation of 1.3 to 1.55 microns.

In the aforementioned example, the mandrel has a diameter of 20 mm and the bar thickness is 15 mm for a length of 75 cm. Other production examples are possible, e.g. a diameter 20 mm mandrel and a bar with an external diameter of 60 mm and a length of 1 m, which gives a production capacity of roughly 200 km of optical fibres, or a diameter 16 mm mandrel and a bar with an external diameter of 46 mm for a length of 40 to 60 cm.

In a particular embodiment of the invention, it is possible to combine the two aforementioned methods. It is possible to combine a fluorine-doped silica deposit on a plasma torch deposition machine with a growth rate of e.g. approximately 0.5 to 1 g/min and a pure silica deposit on a grain-by-grain deposition machine with a growth rate of e.g. 3 to 10 g/min.

Figure 3:
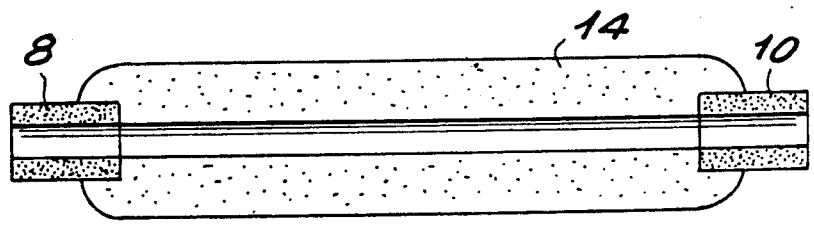
FIG. 3 A diagrammatic view of the hollow bar, from which the mandrel has been removed.

Once the bar 14 is produced, it is removed (FIG. 2), together with the mandrel, from the apparatus shown in FIG. 1. The mandrel is then removed (FIG. 3), which causes no problems due to the fact that the expansion coefficient of the material constituting the mandrel is higher than that of silica. As the deposition of silica takes place at high temperatures, when the bar cools, the mandrel contracts more than the silica and a clearance is formed between bar and mandrel which makes it possible to extract the latter.

Instead of using a mandrel made from a refractory material, it is possible to use a pure silica mandrel, which is then removed by coring and grinding, in order to obtain a desired internal diameter for hollow bar 14.

The use of tubes 8 and 10 makes it possible to control the phenomena induced on each outward and return movement of the plasma torch and facilitates the subsequent manipulation of the bar formed. The use of such tubes ensures other advantages, as will be seen hereinafter.

Figure 4:
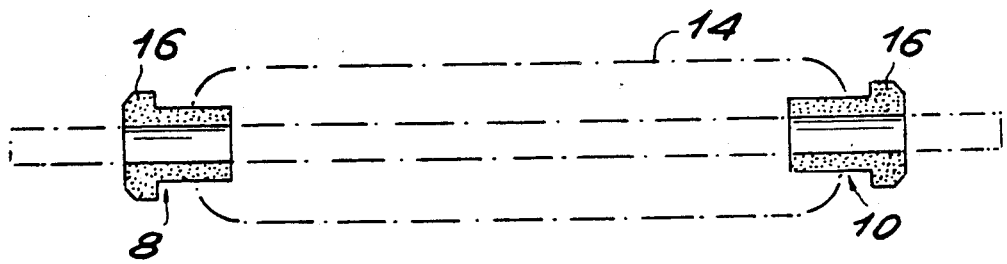
FIG. 4 A diagrammatic view of a special embodiment of silica tubes to be fitted onto the mandrel shown in FIG. 2, prior to the formation of the hollow silica bar.

Tubes 8 and 10 can be simple cylindrical tubes, but in an advantageous embodiment, each tube can have an enlargement 16 (FIG. 4). This enlargement is located at one end of each tube 8 or 10, said tubes then being fitted onto the mandrel, so that the two enlargements are respectively turned towards the ends of said mandrel.

As can be seen in FIG. 4, said enlargement, which has a symmetry of revolution about the tube axis has, in section, a profile e.g. having a side perpendicular to the axis of the tube and turned towards the remainder thereof, followed by a segment parallel to said axis, which is itself followed by a side inclined with respect to the axis in the direction of the tube end.

The use of enlargements makes it possible to form the hollow bar whilst losing a minimum of material (the hollow bar being formed between the two sides perpendicular to the axes of the tubes) and each enlargement constitutes a start for the subsequent operations of stretching the bar or fibre formation, which reduces the number of auxiliary operations in the production of fibres and the loss of material during said production. Moreover, with said enlargements, there is a better homogeneity of the silica deposit.

Figure 5:
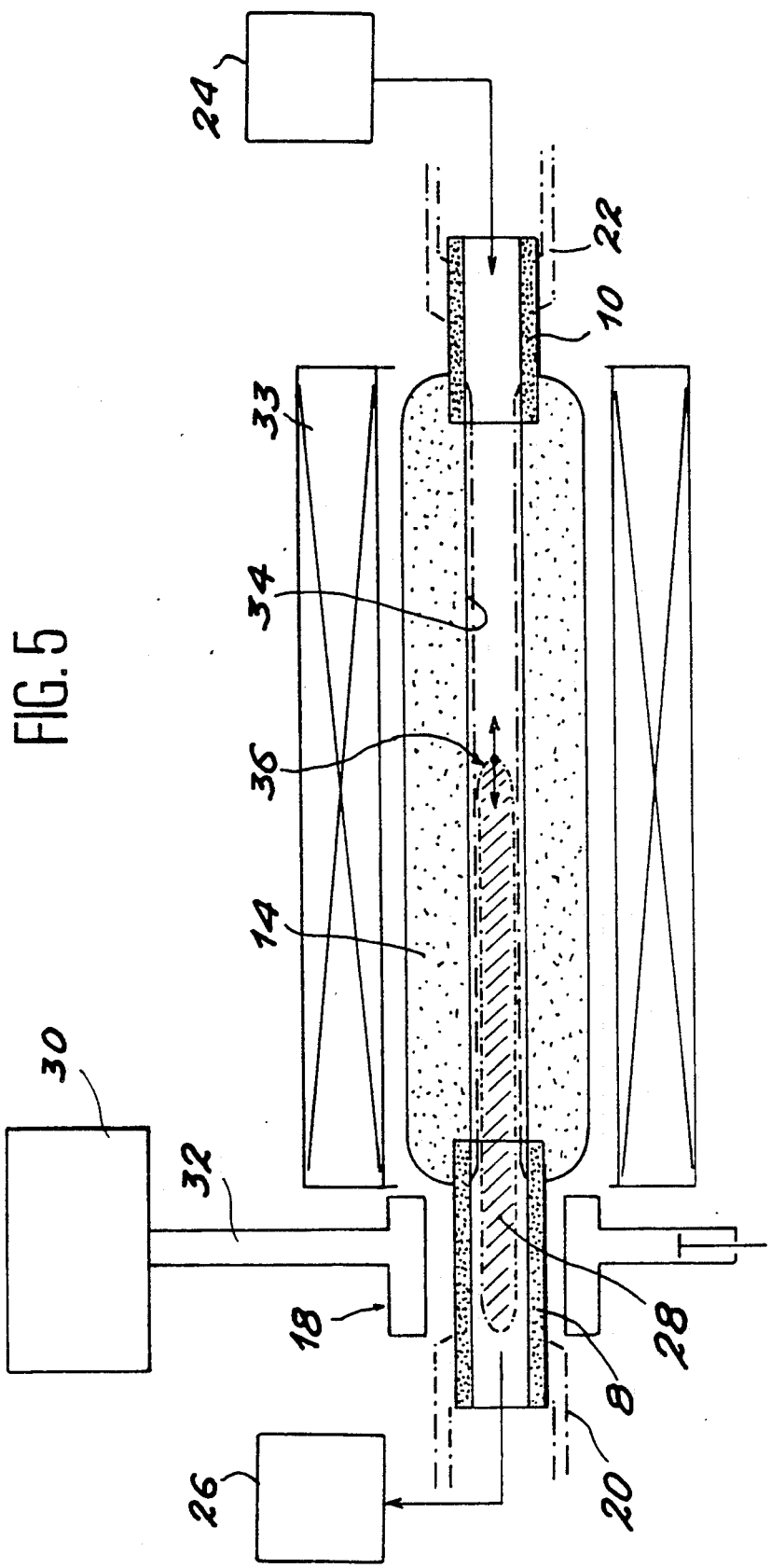
FIG. 5 A diagrammatic view of a special embodiment of an apparatus for performing a method used in the invention for the deposition of a vitreous coating on the inner face of the hollow bar.

FIG. 5 diagrammatically shows an apparatus to be used in the deposition of a vitreous silica coating on the inner face of the hollow bar obtained. The apparatus effects a chemical vapour phase deposition activated by a plasma created by a surface wave and for this purpose has an ultra-high frequency coupler 18, e.g. of the Surfaguide type as described in scientific literature. The tubes 8 and 10 are advantageously used in the apparatus of FIG. 5, the ultra-high frequency coupler 18 surrounding one of these tubes, e.g. tube 8, which makes it possible to produce a coupler having known and reasonable dimensions, the location of said coupler being advantageously outside the useful deposition zone for the vitreous coating.

Tubular end fittings 20 and 22 are provided for respectively holding tubes 8 and 10. The apparatus of FIG. 5 also comprises a system 24 for injecting through end fitting 22 (furthest from the coupler) an appropriate gaseous mixture formed from oxygen and silicon tetrachloride vapour, with a view to obtaining a pure silica coating, or the aforementioned mixture to which has been added a dopant in the form of fluorine or a derivative of the latter, if it is wished to obtain a fluorine-doped silica coating. Germanium doping would require the addition to the mixture in question of traces of $GeCl_4$.

The apparatus of FIG. 5 also comprises pumping means 26 for pumping the gaseous mixture by means of end fitting 20.

When the gaseous mixture circulates within the hollow bar 14, a plasma column 28 is formed within the tube or hollow bar due to the travelling surface wave produced by coupler 18. The latter is energized by a variable power microwave generator 30 via a waveguide 32. Vitreous coating 34 is obtained by modifying the power of generator 30, which leads to an alternating length variation of column 28 and consequently to a displacement of the front 36 of said column from one end to the other of hollow bar 14. Doped or undoped silica deposition takes place level with the front of the plasma column, so that during one outward and return travel thereof in the bar, two elementary vitreous coatings are deposited within the same, all the elementary coatings constituting the vitreous covering 34.

The internal doped or undoped silica deposition takes place with an excellent efficiency or yield (approximately 100% for pure $SiO_2$ and approximately 80% for germanium-doped $SiO_2$) and a speed dependent on the pressure within the hollow bar, the temperature of said bar, the flow rate of the gaseous mixture and the power of the generator.

The interior of the hollow bar where the vitreous coating deposition takes place must be heated to a temperature at least equal to approximately 1000° C., e.g. between 1000° and 1200° C. To this end, the apparatus shown in FIG. 5 has a furnace 33, so that the hollow bar is within said furnace, the end tubes 8 and 10 projecting beyond the same, said furnace being able to reach the desired temperatures.

The gaseous mixture is injected in such a way as to maintain within the hollow bar a pressure between e.g. 10 and 2500 Pa. For example, it is possible to modify the power of the generator between two values between approximately 0 and 3 kW, with a modulation frequency between approximately 0 and 10 kHz.

Using the apparatus shown in FIG. 5, it is possible to easily obtain a vitreous coating deposit at rates of approximately 0.1 to 0.5 g/min, which is satisfactory. Particularly in the case of producing monomode optical fibres, the deposition rate is not a critical factor, bearing in mind the low quality of the vitreous coating to be deposited.

Figure 6:
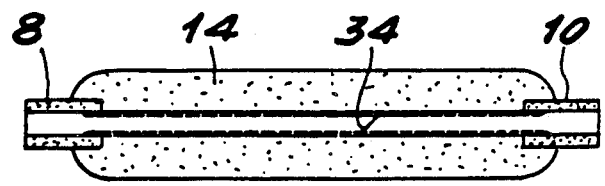
FIG. 6 A diagrammatic view of the bar provided with the vitreous coating.

FIG. 6 diagrammatically shows a hollow bar provided with an inner vitreous coating 34.

In particular in the case of producing monomode optical fibres, it is advantageous with a view to obtaining for them a core having a good quality throughout, to form a not shown buffer zone between the hollow bar and the vitreous coating intended for the formation of the actual core. This buffer zone is of silica when the hollow bar is of pure silica and of doped silica when the hollow bar is of doped silica.

The buffer layer is formed when the hollow bar is in the apparatus of FIG. 5, prior to vitreous coating 34 and in the same way as the latter (with an appropriate gaseous mixture).

Figure 7:
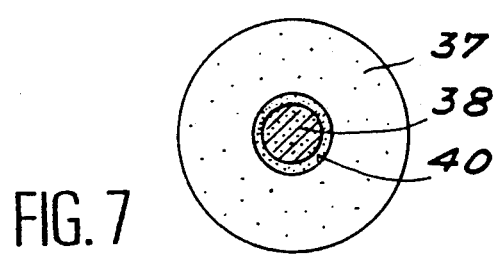
FIG. 7 A diagrammatic sectional view of an optical fibre obtained from a bar produced according to the present invention.

FIG. 7 shows in sectional form an optical fibre obtained from a hollow bar provided with said buffer layer. The fibre has an optical sheath 37, a core 38 and a buffer layer 40. The thickness of the buffer layer corresponding to the hollow bar is e.g. chosen in such a way that the buffer layer 40 of the fibre of FIG. 7 has an external diameter of approximately 14 to 15 microns for a fibre, whose sheath has an external diameter of 125 microns and whose core has a diameter of approximately 8 to 10 microns.

As stated hereinbefore, the nature of the buffer layer is dependent on the profile of the optical index sought for the fibres to be produced. For example, the buffer layer is of fluorine-doped silica for a fibre, whose sheath is of fluorine-doped silica and the core is of pure silica, whilst the buffer layer is of pure silica for a fibre, whose sheath is of pure silica and the core of germanium-doped silica. For example, if the internal deposit corresponds, for a finished optical fibre, to a core with a diameter of 8 microns and a 3 micron thick buffer zone, said deposit corresponds to approximately 35 grams of material for 100 km of fibre and therefore to a deposited thickness of approximately 0.35 mm within the hollow bar having a diameter 20 mm hole. With a deposition rate of 0.3 g/min, this corresponds to a 120 minute deposition, i.e. approximately 50 km of fibre in one hour.

Before depositing the vitreous coating (and the possible buffer layer) and with a view to eliminating any pollution which could be produced on the inner face of the hollow bar during the transfer thereof from one apparatus (FIG. 1) to the other (FIG. 5), it is possible to carry out plasma etching on said inner face using the apparatus shown in FIG. 5, by passing a gaseous mixture containing a fluorine compound into the interior of the hollow bar. The operation of depositing the vitreous coating (and the possible buffer coating) then takes place immediately following said etching and requires no disassembly or manipulation of the hollow bar.

Figure 8:
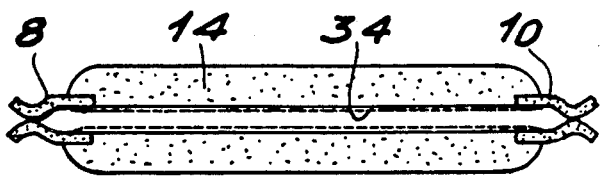
FIG. 8 A diagrammatic view of the bar shown in FIG. 6, whose ends have been sealed.

Once the vitreous coating has been deposited, the hollow bar is removed from the apparatus of FIG. 5 and the end tubes 8 and 10 are sealed, so as to protect the interior of the hollow bar against pollution or the entry of moisture (FIG. 8).

This gives a preform which can be then directly fibred without any intermediate collapsing operation. The fibre formation of the preform can be facilitated by vacuum sealing of the hollow bar.

In the case of a doping of the vitreous coating with germanium and with a view to preventing the volatilization of the germanium during collapsing, it is possible to maintain a slight oxygen pressure during sealing.

Figure 9:
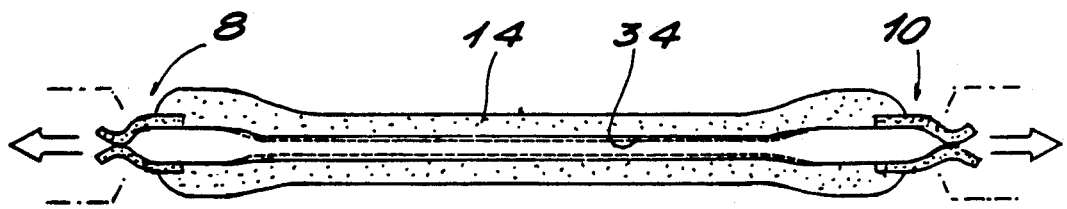
FIG. 9 A diagrammatic view of the bar subject to prestretching-shrinking.

Instead of direct fibre formation of the preform, it is firstly possible to prestretch-collapsing the same on a shrinking machine, in order to obtain a bar with reduced dimensions, e.g. external diameter 39.5 mm, which may be more advantageous for certain fibre formation equipments (FIG. 9).

Figure 10:
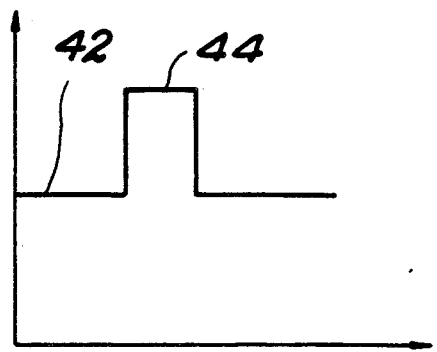
FIGS. 10 and 11 Profiles of the optical index of optical fibres obtained from preforms produced according to the invention.
Figure 11:
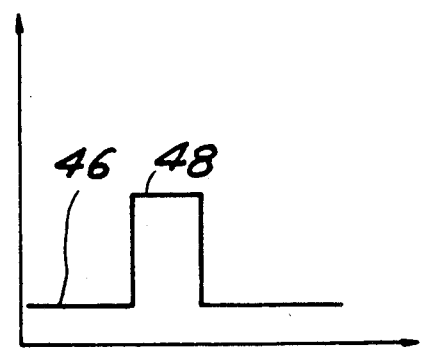

FIG. 10 shows a profile of the index for an optical fibre, which can be produced from a preform obtained according to the invention. This optical fibre has an index jump, the optical sheath (zone 42 of the profile) being of pure silica and the core (zone 44 of the profile) of germanium-doped silica. In another construction, the optical sheath 46 is of fluorine-doped silica, whilst core 48 is of pure silica (FIG. 11).

Other index profiles are possible and can be obtained by appropriately varying the composition of the gaseous mixture passed into the hollow bar during the deposition of the vitreous coating.

As has been seen, the mandrel used in the present invention makes it possible to obtain a hollow bar with high geometrical precision. Moreover, in the case of producing monomode optical fibres, as the internal deposit is then of limited thickness and produced at non-constraining deposition rates, the core of the fibres obtained is very well centred and the geometrical quality of the fibres obtained is then completely independent of complex operations, as in known preform production processes.

The centring of the core is an important factor for the use of monomode fibres with simple connection methods and the centring accuracy (0.1 micron) obtained by the inventive process enables such methods to be performed.

What is claimed is:

1. A process for producing a preform for optical fibres, said process comprising the following successive stages:

forming a hollow silica thick-walled tube on a mandrel by an external deposition method using a plasma torch, said thick-walled tube having a wall thickness greater than or equal to 15 mm wherein, before forming the hollow thick-walled tube, two silica holding tubes are fitted on the mandrel in such a way that the ends of the subsequently formed hollow thick-walled tube respectively partly cover these holding tubes, removing the mandrel, so that the inner face of the hollow thick-walled tube appears, and depositing on said inner face a vitreous coating used for the subsequent formation of the core of the optical fibres, wherein the deposition of the coating is carried out (1) by continuously passing from one end to the other of the hollow thick-walled tube a mixture of ionizable gaseous compounds able to give rise to the coating by reacting together to form within the bore of the hollow thick-walled tube a plasma column which serves to activate the reaction, said plasma column being produced by an ultra-high frequency coupler injecting a travelling surface wave into the thick-walled tube and (2) by continuously and progressively varying electromagnetic power supplied to the ultra-high frequency coupler, so that an end of the plasma column sweeps along the length of the hollow thick-walled tube, said coupler being fixed and located at said other end of the hollow thick-walled tube, and wherein the pressure of the mixture in the hollow thick-walled tube is maintained at below approximately $10^4$ Pa and at least the interior of the hollow thick-walled tube is kept at a temperature at least equal to approximately 1,000° C.

2. A process according to claim 1, wherein the mandrel is rigid and has the shape of a cylinder of revolution with a given diameter.

3. A process according to claim 1, wherein the mandrel is made from a refractory material with an expansion coefficient higher than that of silica.

4. A process according to claim 1, wherein the mandrel is made from silica and is removed by coring and grinding.

5. A process according to claim 1, wherein said process also comprises a stage of forming a buffer zone with an optical index substantially equal to that of the hollow thick-walled tube between the mandrel removal stage and the vitreous coating deposition stage and wherein said buffer zone is formed in the same way as is the vitreous coating with an appropriate gaseous mixture.

6. A process according to claim 1, wherein, following the deposition of the vitreous coating, the two ends of the hollow thick-walled tube are sealed with the aid of the two holding tubes.

7. A process according to claim 1, wherein the end of each of said holding tubes facing the corresponding end of the mandrel has an enlargement portion.

8. A process according to claim 1, wherein said process further comprises a stage of collapsing the hollow thick-walled tube after the deposition stage.

9. A process according to claim 1, wherein said hollow thick-walled tube is made of doped silica.

10. A process according to claim 1, wherein said hollaw thick-walled tube is made of undoped silica.

11. A process according to claim 1, wherein said hollow thick-walled tube comprises a doped silica deposit covered with an undoped silica deposit.

12. A process according to claim 1, wherein the ultra-high frequency coupler coaxially surrounds the holding tube which is located at said other end of the said hollow thick-walled tube.

* * * * *